United States Patent Office 3,242,234
Patented Mar. 22, 1966

3,242,234
ELASTIFICATION OF POLYVINYL CHLORIDE POLYMERS WITH OLEFIN POLYMERS CHLORINATED IN THE PRESENCE OF POLYVINYL CHLORIDE
Hans-Helmut Frey, Frankfurt am Main, Helmut Klug and Karl-Heinz Mittelberger, Gersthofen, near Augsburg, and Friedrich Nolte, Mulheim an der Ruhr, Germany, assignors to Farbwerke Hoechst Aktiengesellschaft vormals Meister Lucius & Bruning, Frankfurt am Main, Germany, a corporation of Germany
No Drawing. Filed July 17, 1961, Ser. No. 124,388
Claims priority, application Germany, July 16, 1960,
F 31,677
16 Claims. (Cl. 260—897)

The present invention relates to elastified polyvinyl chloride and vinyl chloride copolymers and to a process for preparing them.

It has already been proposed to elastify polyvinyl chloride and copolymers of vinyl chloride by adding chlorination products of polyolefins which have been obtained by chlorinating polyolefins in aqueous suspension at a temperature above 90° C. and below 150° C. and contain about 25 to 50% by weight of chlorine. In contradistinction to the chlorination products of polyolefins which have been prepared in the aforesaid temperature range, no elastifying effect can be obtained by adding chlorination products of polyolefins that have been produced at lower temperatures. On the contrary, the addition of the latter products to polyvinyl chloride or vinyl chloride copolymers may involve an embrittlement to an extent such that shaped articles made from mixtures of this kind break already under slight bending stress, that is to say these articles are extremely brittle.

It has now been found that polymers of vinyl chloride, which comprise homopolymers of vinyl chloride and copolymers of vinyl chloride, can be elastified by intimately mixing them with chlorination products of high molecular weight olefinic polymers also referred to herein as polyolefins, especially high molecular weight polyethylene, which have been obtained by chlorinating the said high molecular weight polyolefins in admixture with polymers of vinyl chloride in aqueous suspension until the chlorine content has reached about 20 to 50% by weight, at least 5% by weight of chlorine being incorporated at a temperature ranging from 90 to 150° C., preferably from 100 to 150° C. Owing to the presence of polymers of vinyl chloride, the macromolecular polyolefins have no tendency to form lumps in the chlorination, so that homogeneously chlorinated polyolefin products are obtained, i.e., products which are substantially free from non-chlorinated, crystalline polyolefin portions. It has been found that the homogeneity of chlorination in aqueous phase increases with increasing chlorination temperature. The homogeneity of a chlorination product can be determined, for example, by X-ray spectra or solubility tests. Heterogeneously chlorinated products show in the X-ray spectrum a crystalline portion consisting of non-chlorinated polyolefin crystallites. The more homogeneous the chlorination is the lower is the said crystalline portion. Moreover, heterogeneously chlorinated products are sparingly soluble in organic solvents. For determining the homogeneity of a chlorination product there is especially suitable tetrahydrofurane. The more homogeneous a product is, the more it is soluble in tetrahydrofurane. Heterogeneously products that are soluble in boiling tetrahydrofurane to an extent of up to 50% by weight only have a little or no elastifying effect when mixed with polyvinyl chloride It has been found that the homogeneity of chlorination of a polyolefin suspended in water, for example, polyethylene, increases with the chlorination temperature, and that the polymer of vinyl chloride used as an additive is not further chlorinated or at most further chlorinated to a very slight degree, so that its properties remain substantially unchanged.

When a polymer of vinyl chloride, especially polyvinyl chloride, is chlorinated under the same conditions but in the absence of high molecular polyolefins the chlorination takes place only after a relative prolonged action of chlorine and a post-chlorinated polyvinyl chloride is obtained containing about 65% by weight of chlorine.

Due to the great tendency of the high molecular weight polyolefin to take up chlorine, the chlorination of polymers of vinyl chloride is largely suppressed so that, surprisingly, the polymer of vinyl chloride used as additive is not further chlorinated or it is further chlorinated to a very slight extent only. A higher post-chlorination of the polymer of vinyl chloride would result in the reduction of the elastifying effect of the chlorination products used in the process of the invention and in the decrease of the thermostability of the mixtures.

By copolymers of vinyl chloride which can be elastified according to the invention there are to be understood products that consist essentially of vinyl chloride, i.e., products that are built up from more than 50% by weight of vinyl chloride. As co-components there are mentioned by way of example vinyl esters, such as vinyl acetate, vinyl propionate, vinyl butyrate or vinyl stearate. Further suitable co-components of polymerization are, for example, vinylidene chloride, esters of aliphatic, saturated alcohols containing 1 to 10 carbon atoms with acrylic acid, methacrylic acid, maleic acid or fumaric acid.

As additives in the chlorination of the high molecular polyolefins there can be used the same polymers of vinyl chloride as are elastified by the process of the invention, and particularly polyvinyl chloride.

Especially suitable chlorination products of polyolefins are those which have been chlorinated at gradually raised temperature, for example polyolefins which have been chlorinated first at a temperature in the range from 0 to 90° C. or 45 to 90° C. and preferably 60 to 90° C., and then at a temperature ranging from 90 to 150° C. In the chlorination stage performed at 90 to 150° C. at least 5 and preferably 10% by weight of chlorine shall be taken up by the polyolefin.

The molecular weight of the starting polyolefins largely influences the degree of elastification of polyvinyl chloride or vinyl chloride copolymers by means of chlorinated polyolefins. The higher the molecular weight of the starting polyolefins is, the more tough and elastic are the masses that can be obtained by the process of the invention. Especially favorable results are obtained by adding chlorination products of those polyolefins, particularly polyethylenes, which have an $\eta$/red value of more than 0.5 and preferably more than 0.8, the reduced viscosity being determined with a 0.5% solution of the polyolefin in tetrahydronaphthalene at 120° C. The reduced viscosity can be used as a relative measurement for the molecular weight. On account of their limited solubility in organic solvents polyolefins having an $\eta$/red value of more than 0.5 and preferably more than 0.8 can be chlorinated with special advantage in aqueous suspension. Chlorination products of polyolefins having an $\eta$/red value below 0.5, and accordingly a low molecular weight, yield a lower elastifying effect in vinyl chloride-containing polymers. In general, it is not suitable to use chlorination products of polyolefins having higher molecular weights than correspond to an $\eta$/red value of 20, since the working up of mixture prepared with chlorination products of this kind is rather difficult from a practical point of view. As starting material for the chlorination products to be used in accordance with the invention there are particularly useful polyolefins having an $\eta/\text{red}$ value in the range from 1 to 20 and preferably 1 to 10.

By chlorinated high molecular weight olefinic polymers to be used in accordance with the invention there are to be understood chlorination products of homopolymers of monoolefins and copolymers of monoolefins with one another, for example ethylene, propylene, butylene or isobutylene. Chlorination products of polyethylene and of copolymers of ethylene with propylene have proved to be especially suitable. There is nothing critical about the process used to prepare the starting olefinic polymers preliminary to their use as chlorination products for elastifying vinyl chloride-containing polymers, provided that the molecular weight of the starting polyolefins is sufficiently high. There can be used, for example, chlorination products of a polyethylene that has been prepared by a high pressure polymerization process, i.e. under a pressure of more than 1000 atmospheres and at a temperature above 200° C. However, especially favorable effects are obtained with chlorination products of polyethylenes produced by a low pressure polymerization process, that is to say under a pressure of up to 100 atmospheres and at a temperature of up to 100° C. There are mentioned above all Ziegler polyethylenes which have been prepared, for example, according to the processes disclosed in British specifications 799,392, 799,823, 801,031, 810,023, 810,024, 819,867 and 826,639, that is to say linear polyethylenes having a density of 0.93 to 0.96 determined at 20° C. which have been produced with the aid of a catalyst system consisting of organometal compounds and reducible heavy metal compounds. Especially good results are obtained with chlorination products of the portion of ethylene-propylene copolymers which is insoluble in hydrocarbons boiling at 30 to 200° C.

It is recommended to add to the polyolefin prior to the chlorination 10 to 67%, calculated on the weight of the mixture, of polymers of vinyl chloride so that in the products having an elastifying effect and to be added in accordance with the invention the proportion between the chlorinated macromolecular polyolefin and the polymer of vinyl chloride varies from 9:1 to 1:1.

The improvements which can be obtained by adding polyolefin chlorination products containing more than 50% by weight of chlorine to vinyl chloride-containing polymers are only insignificant. Products having a chlorine content as high as that of polyvinyl chloride do not show a special effect. The best results are obtained with chlorination products containing 30 to 50% by weight of chlorine.

The chlorination products and the vinyl chloride polymers can be mixed within wide limits. Improvements can be obtained when as little as 5% by weight, calculated on the total mixture, of polyolefin chlorination products are intimately mixed with the polymers of vinyl chloride. It is possible to prepare mixtures containing 5 to 90% by weight of polyolefin chlorination product, whereby any desired degree of softness and elasticity can be adjusted. Particularly suitable are mixtures consisting of 5 to 50% by weight of chlorination products and 95 to 50% by weight of polymers of vinyl chloride.

Especially good elastifying effects are obtained when polymers of vinyl chloride are admixed with mixtures of chlorination products of high molecular weight polyolefins having different chlorine contents.

The following examples serve to illustrate the invention but they are not intended to limit it thereto, the parts and percentages being by weight unless otherwise stated.

*Example 1*

100 parts of low pressure polyethylene having a reduced viscosity of 1.7 (determined with a 0.5% solution in tetrahydronaphthalene at 120° C.) and a density of 0.95 at 20° C. were dispersed in 1000 parts of water in an enameled autoclave and chlorinated with gaseous chlorine under a pressure of about 5 atmospheres gauge and at 112° C. In 1 hour 92 parts of chlorine were consumed and 145 parts of chloropolyethylene were obtained having a chlorine content of 31%. The chlorination product was washed with water which contained 0.1% of sodium carbonate and then dried at 50° C.

20 parts of said chlorination product were mixed on the roller for 15 minutes at 175° C. with 80 parts of polyvinyl chloride having a K value (cf. Fikentscher Cellulosechemie, vol. 13, p. 58 [1932]) of 70 with the addition of 2 parts of dibutyl-tin-bis-(thioglycolic acid octyl ester). The mixture obtained was then pressed at 175° C. into 1 and 4 mm. thick sheets which were used for measuring the mechanical values. A corresponding mixture which contained 1% of barium-cadmium laurate as stabilizer instead of 2 parts of dibutyl-tin-bis-(thioglycolic acid octyl ester) served for determining the thermostability on the roller at a temperature of 175° C. The thermostability on the roller is the time after which the mixture begins to color. The mixture first becomes yellowish and then turns dark brown within one minute, while the mixture adheres to the roller. The values obtained are recited in Table 1.

In the following examples the above mentioned stabilizers were used in the same amount.

*Example 2*

100 parts of low pressure polyethylene as used in Example 1 were dispersed in water as described in Example 1 and chlorinated at 112° C. by introducing 137 parts of chlorine within 90 minutes until a chlorine content of 40% was reached. After having washed and dried the chlorination product as described in the preceding example, a mixture was prepared as described in Example 1 from 20 parts of chloropolyethylene and 80 parts of polyvinyl chloride and the mechanical values were determined on press plates. These values are likewise recited in Table 1.

*Example 3*

100 parts of the polyethylene defined in the preceding examples were mixed with 9 parts of polyvinyl chloride having a K value of 70, dispersed in water and then chlorinated at 114° C. by introducing 137 parts of chlorine in 90 minutes. 177 parts of a chlorination product having a chlorine content of 40.8% were obtained which was composed of 168 parts of chloropolyethylene having a chlorine content of 40% and 9 parts of polyvinyl chloride having a chlorine content of 56%. Consequently, the mixture contained 5% of polyvinyl chloride. 79 parts of polyvinyl chloride were elastified with 21 parts of the above mixture so that the final mixture contained 80% of polyvinyl chloride. The mechanical values of press plates made from said mixture and the thermostability on the roller are likewise recited in Table 1.

*Example 4*

100 parts of polyethylene as used in Example 1 were mixed with 33 parts of polyvinyl chloride having a K value of 70 and the mixture was chlorinated in aqeuous dispersion at 118° C. by introducing 68 parts of chlorine. 166 parts of a chlorination product were obtained composed of 33 parts of polyvinyl chloride and 133 parts of chloropolyethylene having a chlorine content of 25%. The mixture contained about 20% of polyvinyl chloride.

25 parts of said mixture were mixed on the roller at 175° C. with 75 parts of polyvinyl chloride having a K value of 70 and from the mixture, which contained 80% of polyvinyl chloride, press plates were made for determining the mechanical values. These values as well as the thermostability on the roller are given in Table 1.

*Example 5*

100 parts of low pressure polyethylene as used in Example 1 were mixed with 36 parts of polyvinyl chloride having a K value of 70, the mixture was dispersed in water and chlorinated at 118° C. by introducing 88 parts of chlorine. 179 parts of a chlorination product were obtained which was composed of 36 parts of polyvinyl chloride and 143 parts of chloropolyethylene having a chlorine content of 30%. The mixture contained 20% of polyvinyl chloride.

25 parts of said mixture were mixed at 175° C. on the roller with 75 parts of polyvinyl chloride having a K value of 70 and press plates were made from the mixture which contained 80% of polyvinyl chloride. The mechanical values measured and the thermostability of the mixture on the roller are recited in Table 1.

Example 6

100 parts of low pressure polyethylene as used in Example 1 were mixed with 39 parts of polyvinyl chloride having a K value of 70, the mixture was dispersed in water and chlorinated at 118° C. by introducing 111 parts of chlorine. 193 parts of a chlorination product were obtained which was composed of 39 parts of polyvinyl chloride and 154 parts of chloropolyethylene containing 35% of chlorine. The mixture contained 20% of polyvinyl chloride.

25 parts of said mixture were mixed on the roller at 175° C. with 75 parts of polyvinyl chloride having a K value of 70 and from the mixture, which contained 80% of polyvinyl chloride, press plates were made for measuring the mechanical values. These values and the thermostability of the mixture on the roller are recited in Table 1.

Example 7

100 parts of polyethylene as used in Example 1 were mixed with 42 parts of polyvinyl chloride having a K value of 70, the mixture was dispersed in water and chlorinated at 118° C. with 137 parts of chlorine in 45 minutes. 210 parts of a chlorination product were obtained containing 43.3% of chlorine and composed of 167 parts of chloropolyethylene having a chlorine content of 40% and 42 parts of polyvinyl chloride having a chlorine content of 56%, which product consequently contained 20% of polyvinyl chloride. When the same polyvinyl chloride was chlorinated under the same conditions in the absence of polyethylene it absorbed practically no chlorine or a very small amount of chlorine only.

25 parts of the above mixture were mixed at 175° C. on the roller with 75 parts of polyvinyl chloride having a K value of 70, and the mixture, which was composed of 80% of polyvinyl chloride, was pressed into sheets for measuring the mechanical values. These values and the thermostability of the mixture on the roller are recited in Table 1.

Example 8

100 parts of polyethylene as used in Example 1 were mixed with 46 parts of polyvinyl chloride having a K value of 70, the mixture was dispersed in water and chlorinated at 118° C. until 170 parts of chlorine were incorporated. 228 parts of a chlorination product were obtained consisting of 46 parts of polyvinyl chloride and 182 parts of chloropolyethylene having a chlorine content of 45%. The mixture contained about 20% of polyvinyl chloride.

25 parts of said mixture were mixed at 175° C. on the roller with 75 parts of polyvinyl chloride having a K value of 70 and from the mixture, which contained 80 parts of polyvinyl chloride, press plates were made for measuring the mechanical values. These values and the thermostability of the mixture on the roller are given in Table 1.

Example 9

100 parts of polyethylene as used in Example 1 were mixed with 50 parts of polyvinyl chloride having a K value of 70, the mixture was dispersed in water and chlorinated at 118° C. until 204 parts of chlorine had been incorporated. 250 parts of a chlorination product were obtained composed of 50 parts of polyvinyl chloride and 200 parts of chloropolyethylene having a chlorine content of 50%. Thus the mixture contained 20% of polyvinyl chloride.

25 parts of said mixture were mixed at 175° C. on the roller with 75 parts of polyvinyl chloride having a K value of 70 and said mixture, which contained 80% of polyvinyl chloride, was pressed into plates for measuring the mechanical values. These values and the thermostability of the mixture on the roller are listed in the following Table 1.

TABLE 1

| Example | Cl content of chloropolyethylene, percent | Notched impact strength, cm.kg./cm.² (DIN 53453 measured on standard bar) at— | | Impact strength cm.kg./cm.² (DIN 53453 measured on standard bar) at −40° C. | Tensile strength (test bar 50 x 10 x 1 mm., feed 100 mm./minute), kg./cm.² | Elongation at break, percent | Thermostability on the roller at 175° C., minutes |
|---|---|---|---|---|---|---|---|
| | | 20° C. | 0° C. | | | | |
| 1 | 31 | 17 | 7 | 80 | 350 | 45 | 30 |
| 2 | 40 | 40 | 7 | 100 | 405 | 60 | 31 |
| 3 | 40 | 45 | 7 | >100 | 330 | 60 | 30 |
| 4 | 25 | 28 | 8 | 90 | 280 | 20 | 35 |
| 5 | 30 | 46 | 15 | (¹) | 330 | 45 | 32 |
| 6 | 35 | 50 | 11 | (¹) | 310 | 50 | 35 |
| 7 | 40 | 47 | 9 | (¹) | 320 | 45 | 34 |
| 8 | 45 | 35 | 6 | (¹) | 350 | 80 | 33 |
| 9 | 50 | 5 | 3 | 50 | 550 | 40 | 32 |

¹ Without break.

Example 10

100 parts of polyethylene as used in Example 1 were mixed with 70 parts of polyvinyl chloride having a K value of 70, the mixture was dispersed in water and chlorinated at 120° C. by introducing 131 parts of chlorine. 234 parts of a chlorination product were obtained composed of 70 parts of polyvinyl chloride and 164 parts of chloropolyethylene having a chlorine content of 39%. The mixture thus contained 30% of polyvinyl chloride.

50 parts of said mixture were mixed for 15 minutes at 175° C. on the roller with 50 parts of polyvinyl chloride having a K value of 70. The mixture which contained 65% of polyvinyl chloride was pressed into plates for measuring the mechanical values. These values and the thermostability of the mixture on the roller are recited in Table 2.

Example 11

100 parts of polyethylene as used in Example 1 were mixed with 78 parts of polyvinyl chloride having a K value of 70, the mixture was dispersed in water and chlorinated at 120° C. by introducing 167 parts of chlorine. 260 parts of a chlorination product were obtained composed of 78 parts of polyvinyl chloride and 182 parts of chloropolyethylene having a chlorine content of 45%. The mixture contained 30% of polyvinyl chloride.

50 parts of said mixture were mixed for 15 minutes at 175° C. on the roller with 50 parts of polyvinyl chloride having a K value of 70. Press plates were made from said mixture which contained 65% of polyvinyl chloride and the mechanical values were measured. These values and the thermostability of the mixture on the roller are listed in Table 2.

*Example 12*

100 parts of polyethylene as used in Example 1 were mixed with 86 parts of polyvinyl chloride having a K value of 70, the mixture was dispersed in water and chlorinated at 120° C. by introducing 204 parts of chlorine. 286 parts of a chlorination product were obtained composed of 86 parts of polyvinyl chloride and 200 parts of chloropolyethylene having a chlorine content of 50%. The mixture contained 30% of polyvinyl chloride.

50 parts of said mixture were mixed for 15 minutes at 175° C. on the roller with 50 parts of polyvinyl chloride having a K value of 70. Press plates were made from the mixture which contained 65% of polyvinyl chloride and the mechanical values were measured. These values and the thermostability of the mixture on the roller are given in Table 2.

*Example 13*

100 parts of polyethylene as used in Example 1 were mixed with 182 parts of polyvinyl chloride having a K value of 70, the mixture was dispersed in water and chlorinated at 120° C. by introducing 167 parts of chlorine. 364 parts of a chlorination product were obtained composed of 182 parts of polyvinyl chloride and 182 parts of chloropolyethylene having a chlorine content of 45%. The mixture thus contained 50% of polyvinyl chloride.

70 parts of said mixture were mixed for 15 minutes at 175° C. on the roller with 35 parts of polyvinyl chloride having a K value of 70. Press plates were made from the mixture which contained 65% of polyvinyl chloride. The measured mechanical values and the thermostability of the mixture on the roller are given in Table 2.

ample 1. After washing and drying 154 parts of chloropolyethylene were obtained having a chlorine content of 35%.

10 parts of said chloropolyethylene were mixed for 15 minutes at 175° C. on the roller with 90 parts of polyvinyl chloride having a K value of 70. The mechanical values of said mixture are recited in Table 3.

*Example 15*

100 parts of the same low pressure polyethylene as used in Example 14 were mixed with 41 parts of polyvinyl chloride having a K value of 70, the mixture was dispersed in water and chlorinated at 117° C. by introducing 131 parts of chlorine. 205 parts of a chlorination product were obtained composed of 41 parts of polyvinyl chloride and 164 parts of chloropolyethylene having a chlorine content of 39%. The mixture thus contained 20% of polyvinyl chloride.

12.5 parts of said mixture were mixed for 15 minutes at 175° C. on the roller with 87.5 parts of polyvinyl chloride having a K value of 70 and press plates were made from said mixture which contained 90% of polyvinyl chloride. The mechanical values measured on the plates and the thermostability of the mixture on the roller are indicated in Table 3.

*Example 16*

100 parts of the same low pressure polyethylene as used in Example 14 were mixed with 40 parts of polyvinyl chloride having a K value of 70, the mixture was dispersed in water and chlorinated in two stages, first at 75° C. by introducing 68 parts of chlorine until a chlorine content of 25% was reached and then, after having heated the mixture to 126° C., by further introducing 52 parts of chlorine until the chloropolyethylene had a chlorine content of 37%. 199 parts of a chlorination product were obtained composed of 40 parts of polyvinyl chloride and 159 parts of chloropolyethylene having a chlorine content of 37%. The mixture contained 20% of polyvinyl chloride.

12.5 parts of said mixture were mixed on the roller for

TABLE 2

| Example | Cl content of chloropoly-ethylene, percent | Notched impact strength, cm.kg./cm.$^2$ (DIN 53453 measured on standard bar) at— | | Impact strength cm.kg./cm.$^2$ (DIN 53453 measured on standard bar) at −40° C. | Tensile strength (test bar 50 x 10 x 1 mm., feed 100 mm./minute), kg./cm.$^2$ | Elongation at break, percent | Thermostability on the roller at 175° C., minutes |
|---|---|---|---|---|---|---|---|
| | | 20° C. | 0° C. | | | | |
| 10 | 39 | (¹) | 50 | (¹) | 205 | 90 | 30 |
| 11 | 45 | 50 | 40 | (¹) | 250 | 130 | 29 |
| 12 | 50 | 35 | 17 | 50 | 320 | 140 | 31 |
| 13 | 45 | 53 | 44 | (¹) | 340 | 70 | 29 |

¹ Without break.

*Example 14*

100 parts of a low pressure polyethylene having a reduced viscosity of 4.4 (determined with a 0.5% solution in tetrahydronaphthalene at 120° C.) and a density of 0.95 at 20° C. were dispersed in water and chlorinated at 118° C. with 111 parts of chlorine as described in Ex- 15 minutes at 175° C. with 87.5 parts of polyvinyl chloride having a K value of 70. Press plates were made from the mixture which contained 90% of polyvinyl chloride and the mechanical values were measured. These values and the thermostability of the mixture on the roller are recited in the following Table 3.

TABLE 3

| Example | Temperature of first stage, ° C. | Cl content of first stage, percent | Temperature of last stage, ° C. | Final Cl content, percent | Notched impact strength, cm. kg./cm.$^2$ | | Impact strength, cm. kg./cm.$^2$, −40° C. | Tensile strength, kg./cm.$^2$ | Elongation at break, percent | Thermostability on the roller at 175° C., minutes |
|---|---|---|---|---|---|---|---|---|---|---|
| | | | | | 20° C. | 0° C. | | | | |
| 14 | 118 | | 118 | 35 | 20 | 5 | 50 | 350 | 50 | 32 |
| 15 | 117 | | 117 | 39 | 15 | 4 | 40 | 480 | 30 | 31 |
| 16 | 75 | 25 | 126 | 37 | 45 | 12 | (¹) | 420 | 40 | 33 |

¹ Without break.

Example 17

100 parts of an ethylene/propylene copolymer produced by a low pressure process from a mixture of 90% of ethylene and 10% of propylene and insoluble in hydrocarbons boiling at 120–220° C., which copolymer had a reduced viscosity of 2.4 (determined with a 0.5% solution in tetrahydronaphthalene at 120° C.), were dispersed in water and chlorinated at 110° C. as described in Example 1 with 68 parts of chlorine. After having washed and dried there were obtained 133 parts of chlorinated copolymer having a chlorine content of 25%.

10 parts of said chlorinated copolymer were mixed for 15 minutes at 175° C. on the roller with 90 parts of polyvinyl chloride having a K value of 70. The mechanical values of plates made from said mixture are given in Table 4.

Example 18

100 parts of the copolymer as used in Example 17 were dispersed in water and chlorinated at 110° C. with 88 parts of chlorine. After washing and drying, 143 parts of chlorinated copolymer were obtained having a chlorine content of 30%.

10 parts of the chlorinated copolymer were mixed on the roller for 15 minutes at 175° C. with 90 parts of polyvinyl chloride having a K value of 70. The mechanical values of plates made from the mixture are recited in Table 4.

Example 19

100 parts of the copolymer used in Example 17 were mixed with 57 parts of polyvinyl chloride having a K value of 70, the mixture was dispersed in water and chlorinated at 120° C. by introducing 68 parts of chlorine. 190 parts of a chlorination product were obtained composed of 57 parts of polyvinyl chloride and 133 parts of chlorinated copolymer having a chlorine content of 25%. The mixture contained 30% of polyvinyl chloride.

14.5 parts of said mixture were mixed on the roller for 15 minutes at 175° C. with 85.5 parts of polyvinyl chloride having a K value of 70. Press plates were made from the mixture obtained which contained 90% polyvinyl chloride and the mechanical values were measured. These values and the thermostabiilty of the mixture on the roller are recited in Table 4.

Example 20

100 parts of the copolymer as used in Example 17 were mixed with 61 parts of polyvinyl chloride having a K value of 70, the mixture was dispersed in water and chlorinated at 120° C. by introducing 88 parts of chlorine, 204 parts of a chlorination product were obtained composed of 61 parts of polyvinyl chloride and 143 parts of chlorinated copolymer having a chlorine content of 30%. The mixture contained 30% of polyvinyl chloride.

14.5 parts of said mixture were mixed for 15 minutes at 175° C. on the roller with 85.5 parts of polyvinyl chloride having a K value of 70. Press plates were made from the mixture obtained which contained 90% polyvinyl chloride, for measuring the mechanical values. These values and the thermostability of the mixture on the roller are listed in Table 4.

Example 21

100 parts of the copolymer as used in Example 17 were mixed with 66 parts of polyvinyl chloride having a K value of 70, the mixture was dispersed in water and chlorinated at 120° C. by introducing 111 parts of chlorine. 220 parts of a chlorination product were obtained composed of 66 parts of polyvinyl chloride and 154 parts of chlorinated copolymer having a chlorine content of 35%. The mixture contained 30% of polyvinyl chloride.

14.5 parts of said mixture were mixed on the roller for 15 minutes at 175° C. with 85.5 parts of polyvinyl chloride having a K value of 70. Press plates were made from the mixture (content of polyvinyl chloride: 90%) for measuring the mechanical values. These values and the thermostability of the mixture on the roller are listed in the following Table 4.

TABLE 4

| Example | Cl content of copolymer, percent | Notched impact strength, cm.kg./cm.² | | Impact strength, cm.kg./cm.², −40° C. | Tensile strength, kg./cm.² | Elongation at break, percent | Thermostability on the roller at 175° C., minutes |
|---|---|---|---|---|---|---|---|
| | | 20° C. | 0° C. | | | | |
| 17 | 25 | 25 | 5 | 60 | 420 | 30 | 28 |
| 18 | 30 | 30 | 6 | 70 | 430 | 35 | 23 |
| 19 | 25 | 40 | 8 | 90 | 430 | 45 | 26 |
| 20 | 30 | 45 | 10 | 100 | 420 | 45 | 25 |
| 21 | 35 | 35 | 7 | 80 | 400 | 50 | 26 |

Example 22

100 parts of a high pressure polyethylene having a reduced viscosity of 1.0 (determined with a 0.5% solution in tetrahydronaphthalene at 120° C.) were dispersed in water and chlorinated at 90° C. as described in Example 1 with 137 parts of chlorine until a chlorine content of 40% was reached.

20 parts of said chloropolyethylene were mixed on the roller for 15 minutes at 175° C. with 80 parts of polyvinyl chloride having a K value of 70. The mechanical values of the mixture obtained are given in Table 5.

Example 23

100 parts of the high pressure polyethylene as used in Example 22 were mixed with 43 parts of polyvinyl chloride having a K value of 70, the mixture was dispersed in water and chlorinated at 105° C. by introducing 137 parts of chlorine. There were obtained 210 parts of a chlorination product composed of 43 parts of polyvinyl chloride and 167 parts of chloropolyethylene having a chlorine content of 40%. The mixture contained 20% of polyvinyl chloride.

25 parts of said mixture were mixed on the roller for 15 minutes at 175° C. with 75 parts of polyvinyl chloride having a K value of 70. Press plates were made from the mixture obtained which contained 80% of polyvinyl chloride and the mechanical values were measured. These values and the thermostability of the mixture on the roller are indicated in the following Table 5.

TABLE 5

| Example | Cl content of chloropoly-ethylene, percent | Notched impact strength, cm.kg./cm.² 20° C. | Notched impact strength, cm.kg./cm.² 0° C. | Impact strength, cm.kg./cm.², −40° C. | Tensile strength, kg./cm.² | Elongation at break, percent | Thermostability on the roller at 175° C., minutes |
|---|---|---|---|---|---|---|---|
| 22 | 40 | 6 | 3 | 20 | 270 | 45 | 15 |
| 23 | 40 | 12 | 5 | 50 | 300 | 40 | 13 |

We claim:

1. A process for elastifying a base polymer of the group consisting of polyvinyl chloride and copolymers of vinyl chloride with up to 50 percent by weight of a comonomer of the group consisting of vinyl esters, vinylidene chloride and esters of acrylic, methacrylic, maleic and fumaric acids with aliphatic, saturated alcohols of one to ten carbon atoms which comprises forming a chlorination product by chlorinating a high molecular weight olefinic polymer of the group consisting of homopolymers of olefins and copolymers of olefins with one another to a chlorine content of about 20 to 50 percent by weight while said olefinic polymer is in an aqueous suspension and in admixture with about 10 to 67%, calculated on the weight of the mixture, of said base polymer, at least 5 percent by weight chlorine being incorporated into the olefin polymer at a temperature in the range of 90 to 150° C., and admixing said chlorination product with additional base polymer to achive a final relative proportion by weight of total base polymer to said chlorinated high molecular weight olefinic polymer of from 95:5 to 10:90.

2. A process as defined in claim 1, wherein the base polymer is polyvinyl chloride.

3. A process as defined in claim 1, wherein said olefinic polymer is a low pressure polyolefin.

4. A process as defined in claim 1, wherein said olefinic polymer is a polyethylene.

5. A process as defined in claim 1, wherein said olefinic polymer is a low pressure polyethylene.

6. A process as defined in claim 1, wherein said olefinic polymer is a polyethylene having a density within the range of 0.93 to 0.96.

7. A process as defined in claim 1, wherein said olefinic polymer is a low pressure copolymer of ethylene and propylene.

8. A process as defined in claim 1, wherein said olefinic polymer is the fraction of a low pressure copolymer of ethylene and propylene which is insoluble in hydrocarbons boiling between 30° C. and 200° C.

9. A process as defined in claim 1, wherein said olefinic polymer has a reduced viscosity within the range of 0.5 to 20, determined in a 0.5 percent solution of the polymer of olefins in tetrahydronaphthalene at 120° C.

10. A process as defined in claim 1, wherein said olefinic polymer is chlorinated to a chlorine content in the range of 30 to 50 percent.

11. A process as defined in claim 1, wherein a preliminary portion of the chlorination is carried out at a temperature in the range of 0° to 90° C.

12. A composition of matter consisting of (1) 10 to 95% by weight of a base polymer of the group consisting of polyvinyl chloride and copolymers of vinyl chloride with up to 50 percent by weight of a comonomer selected from the group consisting of vinyl esters, vinylidene chloride and esters of acrylic, methacrylic, maleic and fumaric acids with aliphatic, saturated, monohydric alcohols of one to ten carbon atoms, in intimate admixture with (2) 90 to 5% by weight of a chlorination product prepared by chlorinating a high molecular weight olefinic polymer of the group consisting of homopolymers of olefins and copolymers of olefins with one another to a chlorine content of about 20 to 50 percent by weight, while said olefinic polymer is in aqueous suspension and in admixture with about 10 to 67%, calculated on the weight of said last-named mixture of said base polymer, at least 5 percent by weight of the chlorine having been incorporated into said high molecular weight olefinic polymer at a temperature in the range of 90 to 150° C.

13. Composition of matter as defined in claim 12, wherein the olefinic polymer in said chlorination product is a high molecular weight low pressure polyolefin.

14. Composition of matter as defined in claim 12, wherein the olefinic polymer in said chlorination product is a chlorinated polyethylene.

15. Composition of matter as defined in claim 12, wherein the olefinic polymer in said chlorination product is a chlorinated copolymer of ethylene and propylene.

16. Composition of matter as defined in claim 12, wherein the base polymer is polyvinyl chloride.

References Cited by the Examiner

UNITED STATES PATENTS

| 2,592,763 | 4/1952 | Taylor | 260—897 |
| 3,006,889 | 10/1961 | Frey | 260—897 |

FOREIGN PATENTS

| 233,811 | 11/1959 | Australia. |
| 621,621 | 6/1961 | Canada. |
| 1,045,089 | 11/1958 | Germany. |
| 1,051,493 | 2/1959 | Germany. |

MURRAY TILLMAN, *Primary Examiner.*

WILLIAM H. SHORT, *Examiner.*